(12) United States Patent
Tanaka

(10) Patent No.: US 9,647,441 B2
(45) Date of Patent: May 9, 2017

(54) TERMINAL BOX

(71) Applicant: Hosiden Corporation, Yao-shi (JP)

(72) Inventor: Toshiya Tanaka, Yao (JP)

(73) Assignee: Hosiden Corporation, Osaka (JP)

( * ) Notice: Subject to any disclaimer, the term of this patent is extended or adjusted under 35 U.S.C. 154(b) by 13 days.

(21) Appl. No.: 14/794,859

(22) Filed: Jul. 9, 2015

(65) Prior Publication Data

US 2016/0013628 A1    Jan. 14, 2016

(30) Foreign Application Priority Data

Jul. 11, 2014  (JP) ................................. 2014-143048

(51) Int. Cl.
| | |
|---|---|
| *H02S 40/34* | (2014.01) |
| *H02G 15/06* | (2006.01) |
| *H02G 3/18* | (2006.01) |

(52) U.S. Cl.
CPC ............. *H02G 15/06* (2013.01); *H02G 3/18* (2013.01); *H02S 40/34* (2014.12)

(58) Field of Classification Search
CPC ..................................... H02S 40/34
USPC ..................................... 136/244
See application file for complete search history.

(56) References Cited

U.S. PATENT DOCUMENTS

| | | | |
|---|---|---|---|
| 2010/0039781 A1* | 2/2010 | Tai | ........................... H02S 40/34 361/752 |
| 2011/0136395 A1 | 6/2011 | Yamazaki | |
| 2012/0012162 A1 | 1/2012 | Kobayashi | |
| 2012/0048615 A1 | 3/2012 | Masumoto | |
| 2014/0209376 A1 | 7/2014 | Masumoto | |
| 2016/0020591 A1* | 1/2016 | Tanaka | ................... H02G 3/083 174/541 |

FOREIGN PATENT DOCUMENTS

| | | |
|---|---|---|
| EP | 2330634 A2 | 6/2011 |
| EP | 2423978 A2 | 2/2012 |
| JP | 1126035 A | 1/1999 |

* cited by examiner

*Primary Examiner* — Hung V Ngo
(74) *Attorney, Agent, or Firm* — The Webb Law Firm

(57) ABSTRACT

Provided is a terminal box that allows easy insertion of a tab thereto, irrespectively of the position or direction of the tab extended from a solar cell module. A terminal box with a pair of tabs connected thereto for outputting electric power generated by a solar cell module, includes a case having an accommodating space therein and a pair of electrode plates disposed in the accommodating space. Each one of the pair of electrode plates has a terminal connecting portion to be connected with the tab and a cable connecting portion to which an output cable transmitting the electric power to an external device is connected. The case has tab inserting holes allowing insertion of the tabs into the accommodating space, the tab inserting holes being formed in an opposing face of the case opposing the electrode plates and at positions across the terminal connecting portion of at least one of the pair of electrode plates as the case is viewed perpendicularly above the opposing face.

4 Claims, 4 Drawing Sheets

TERMINAL BOX

CROSS REFERENCE TO RELATED APPLICATION

This application is based on and claims priority under 35 U.S.C. Section 119 to Japanese Patent Application No. 2014-143048 filed on Jul. 11, 2014, the entire content of which is incorporated herein by reference.

TECHNICAL FIELD

This disclosure relates to a terminal box with a pair of tabs connected thereto for outputting electric power generated by a solar cell module.

RELATED ART

Conventionally, a terminal box is attached to a solar cell module. This terminal box houses an electrode plate, to which plate a pair of tabs outputting electric power generated by the solar cell module are connected. Further, to the electrode plate, an output cable is also connected. Via this output cable, the electric power generated by the solar cell module is fed to e.g. an external device. An example of technique relating to such terminal box is known from JP11-26035A.

The solar cell module terminal box disclosed in JP11-26035A includes a terminal plate (corresponding to the "electrode plate" described above) housed in a box made of resin; and to this electrode plate, one end of a cable for external connection (corresponding to the "output cable" described above) is connected. The terminal plate defines an engaging hole for engagement with an engaging projection projecting from a box body. After its engagement with the hole, the engaging projection will be fused and then cured, whereby the terminal plate is fixed to the box body. A bottom face of the box body defines an aperture portion for cable connection. Into this cable connection aperture portion, a lead cable (corresponding to the "tabs" described above) for connecting an electrode of the solar cell module with the terminal plate is inserted.

SUMMARY

Here, the position and direction of the lead cable extended from the solar cell module vary in many ways, depending on the particular solar cell module employed. For this reason, in the case of the technique disclosed in JP11-26035A, insertion of the lead cable into the box body can sometimes be difficult, depending on the positional relation between the terminal plate and the cable connection aperture portion.

Embodiments of the present invention comprise a terminal box that allows easy insertion of a tab thereto, irrespectively of the position or direction of the tab extended from a solar cell module.

According to one embodiment of a terminal box relating to this disclosure, a terminal box with a pair of tabs connected thereto for outputting electric power generated by a solar cell module, the terminal box comprising:
  a case having an accommodating space therein; and
  a pair of electrode plates disposed in the accommodating space;
  each one of the pair of electrode plates having a terminal connecting portion to be connected with the tab and a cable connecting portion to which an output cable transmitting the electric power to an external device is connected; and
  the case having tab inserting holes allowing insertion of the tabs into the accommodating space, the tab inserting holes being formed in an opposing face of the case opposing the electrode plates and at positions across the terminal connecting portion of at least one of the pair of electrode plates as the case is viewed perpendicularly above the opposing face.

In the above case, relative to at least one electrode plate, the tab inserting holes can be disposed at positions opposing thereto, relative to the terminal connecting portion as the center in the top plan view of the case, i.e. when the case is viewed from above. Therefore, if the tab inserting holes are disposed in opposition relative to both of the electrode plates respectively, insertion of the tabs into the case can be effected easily, regardless of the positions or directions of the tabs extended from the solar cell module. Further, if the tab inserting holes are disposed in opposition to only one of the pair of electrode plates, firstly the tab inserting hole of the electrode plate to which the tab inserting hole is not disposed in opposition thereto will be fixed in position according to the position or direction of the tab extended from the solar cell module and one of the tab inserting holes disposed at the position in opposition to the other electrode plate will be used. With this, the insertion of the tabs into the case can be effected easily. Consequently, it has become possible to facilitate insertion of a tab into a terminal box irrespectively of the position or direction of the tab extended from the solar cell module, thus realizing a terminal box having high versatility in disposing.

Also, according to one embodiment of the terminal box, each one of the electrode plates defines an aperture portion at a position opposing to the tab inserting hole.

In this case, as the path for advancement of the tab to be inserted through the tab inserting hole is not blocked by the electrode plate, so that the tab can be inserted into the accommodating space smoothly. Further, by aligning the tab inserting hole included in the case with the aperture portion included in the electrode plate in position with each other, positioning of the electrode plate relative to the case can be carried out easily.

Further, according to a further embodiment of the terminal box, the case has at least three disposing positions allowing disposing of the electrode plates in the accommodating space.

In this case, there can be provided a variety of introducing paths selectively for the tabs to be inserted into the accommodating space. Therefore, in mounting of the terminal module, versatility can be further enhanced.

DESCRIPTION OF EMBODIMENTS

A terminal box relating to this disclosure is configured to allow easy connection of a pair of tabs thereto, irrespectively of extending directions of a pair of tabs from a solar cell module. Next, embodiments of the terminal box 1 relating to this disclosure will be explained.

Figure 1:
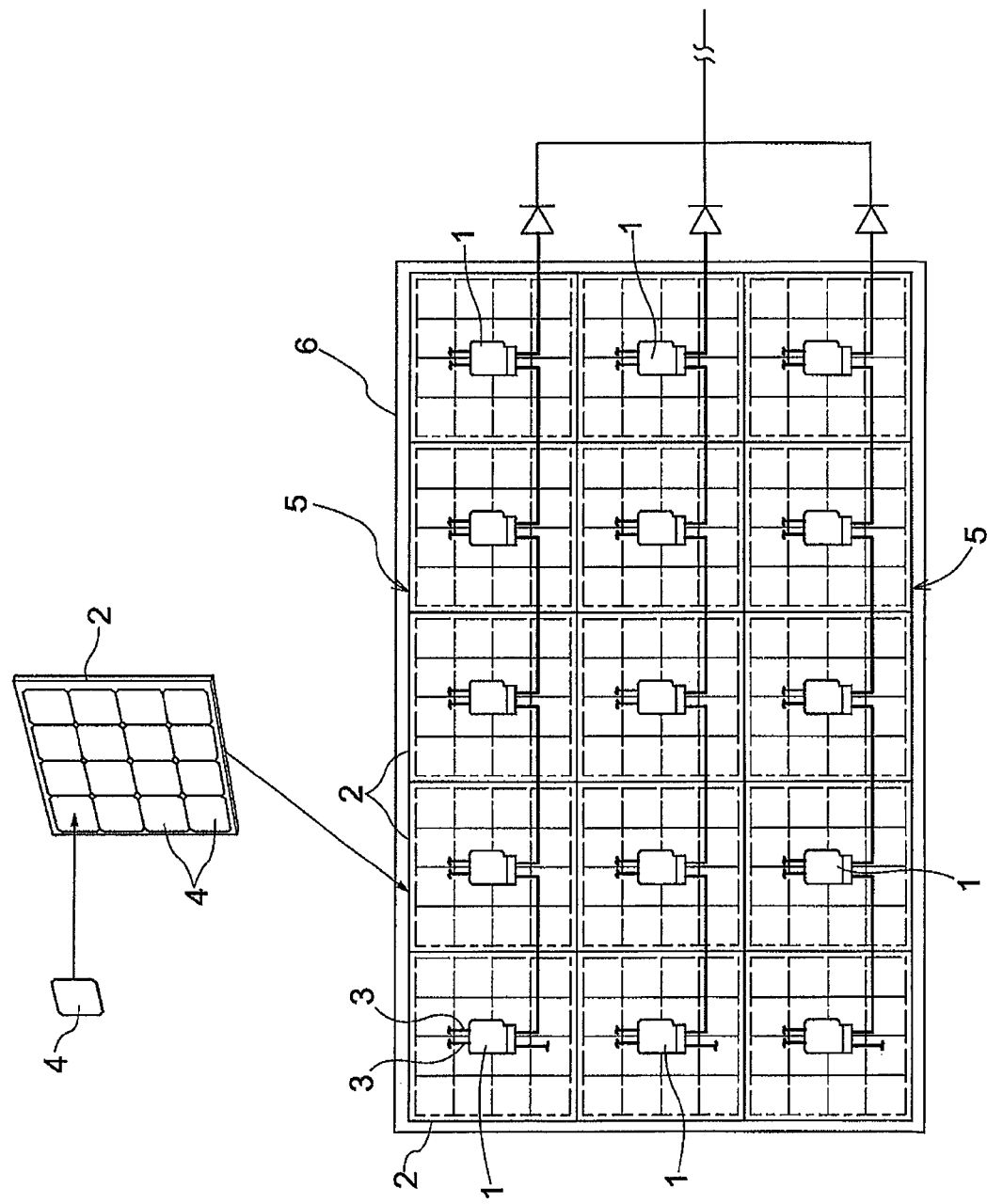
FIG. 1 is a view showing a terminal box to be provided for a solar cell module.

As shown in FIG. 1, to a terminal box 1, there are connected a pair of positive and negative tabs 3 for outputting electric power generated by a solar cell module 2 as an electric energy. The solar cell module 2 is comprised of a plurality of solar cells 4 connected in series and in parallel with each other. As a plurality of sets of the solar cell modules 2 above are connected in series, strings 5 are formed and parallel connection of these strings 5 together forms a photovoltaic panel 6. In forming the strings 5 shown in FIG. 1, each solar cell module 2 is connected with other solar cell modules 2 via the terminal box 1.

Figure 2:
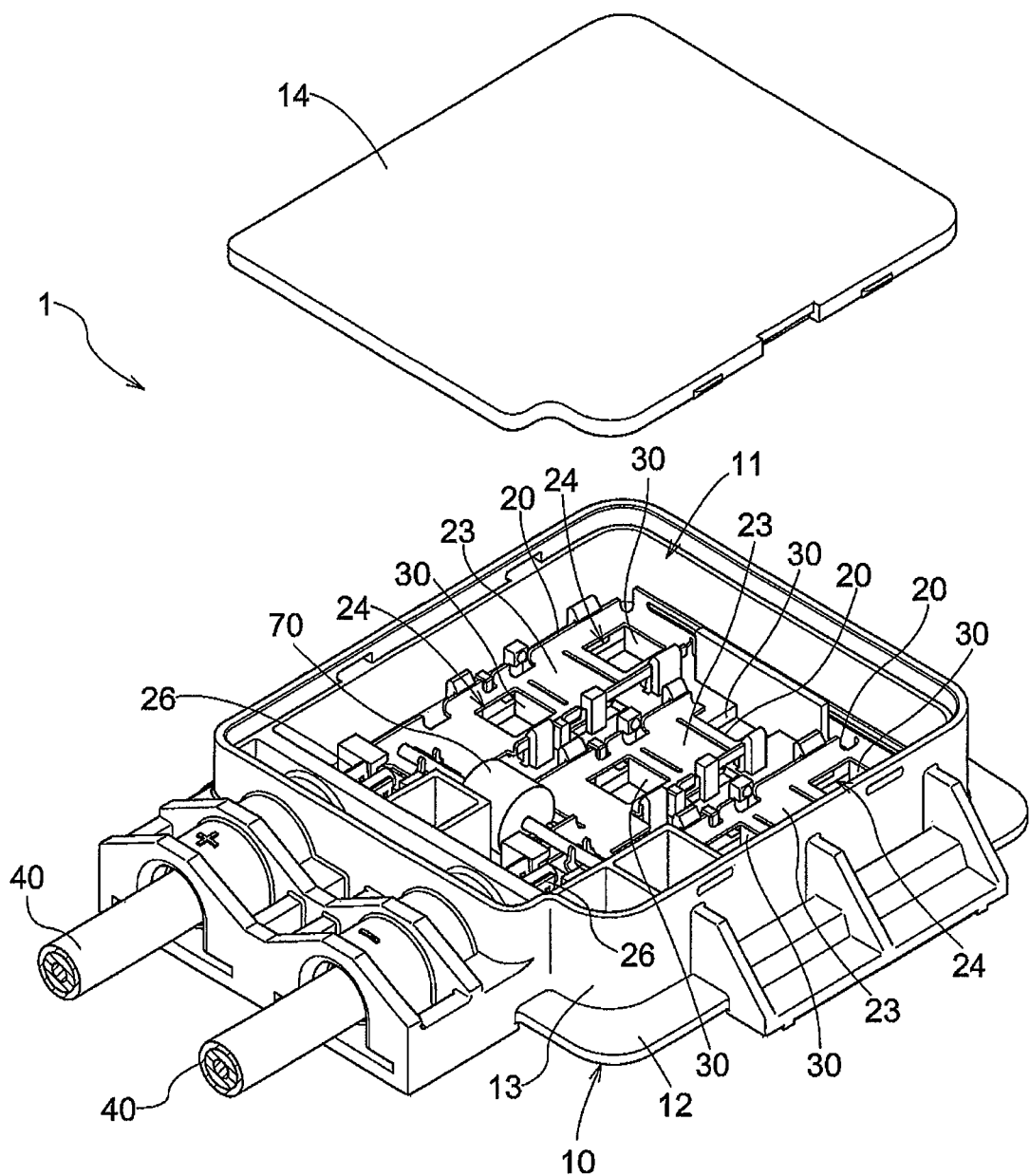
FIG. 2 is a perspective view of the terminal box.

FIG. 2 shows a perspective diagram showing the terminal box 1. The terminal box 1 includes a case 10 and electrode plates 20 as shown in FIG. 2. The case 10 includes a square-shaped bottom plate 12, a tubular portion 13 extending erect from the bottom plate 12 and a top plate 14 to be attached to the upper end portion of the tubular portion 13 in opposition to the bottom plate 12. For the sake of readiness of understanding, in the illustration of FIG. 2, the top plate 14 is shown as being detached from the tubular portion 13.

Figure 3:
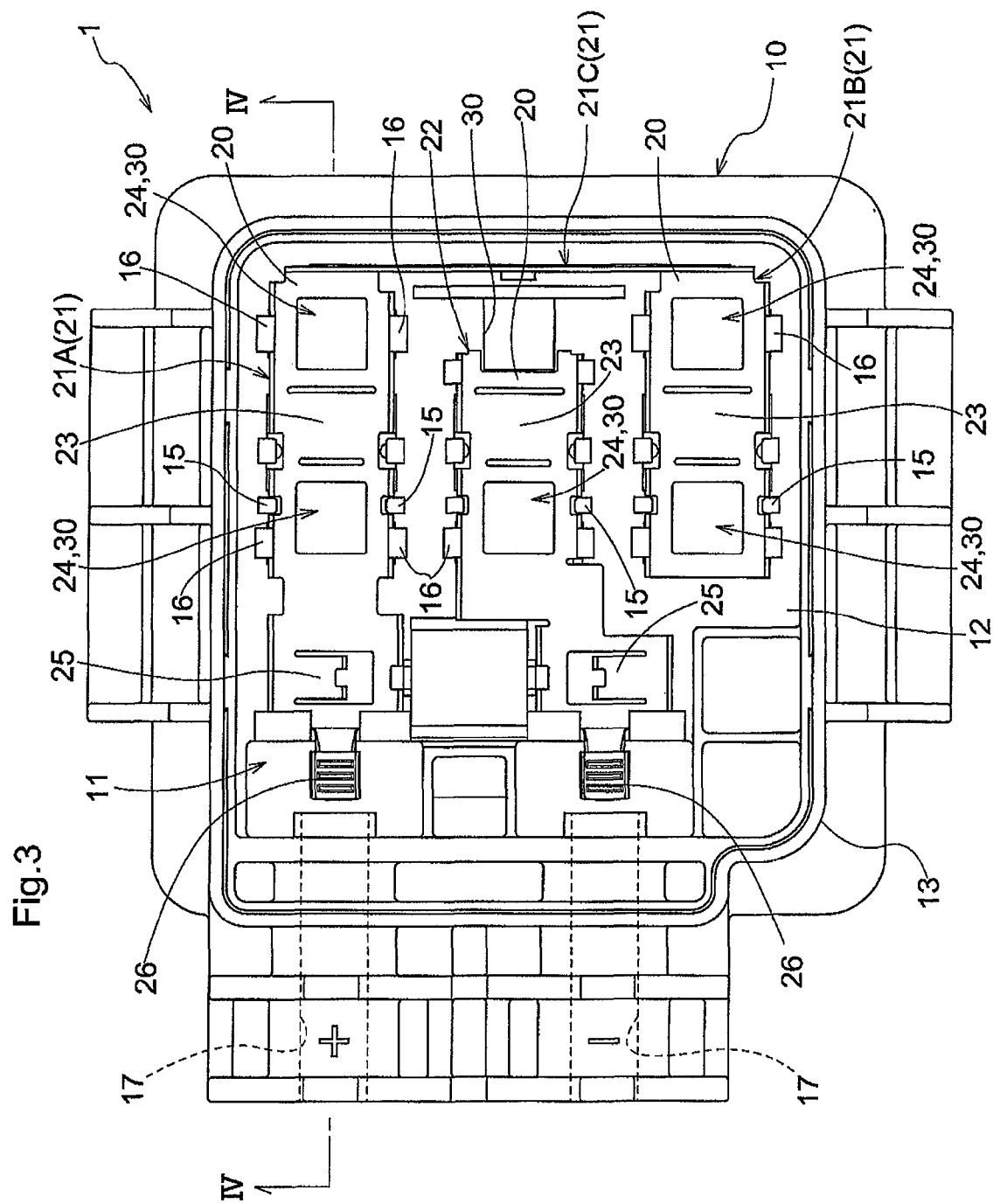
FIG. 3 is a top plan view of the terminal box (with a top plate removed)

FIG. 3 shows a top plan view of the terminal box 1 with the top plate 14 being removed therefrom. As shown in FIG. 3, in the instant embodiment, the tubular portion 13 is provided in an approximately square shape, but this can alternatively be provided in any other shape such as a cylindrical shape, a polygonal tubular shape. The bottom plate 12, the tubular portion 13 and the top plate 14 together form an accommodating space 11 inside the case 10.

Further, at predetermined positions in the tubular portion 13, there are formed a pair of through holes 17 communicating between the outside and the inside of the case 10. Into these through holes 17, a pair of output cables 40 to be described later will be inserted respectively, with the cables 40 being fixed to the case 10 via clamping members 19 (see FIG. 4). The bottom plate 12 of the case 10 define a plurality of tab inserting holes 30 which will be described in details later. This case 10 can be formed with using a resin for instance.

The electrode plates 20 are formed with using plate-like conductive members. As shown in FIG. 3, the electrode plates 20 are provided in a pair. In the following discussion, for the sake of readiness of understanding, one electrode plate to be used as a positive electrode plate will be designated as an electrode plate 21 and the other electrode plate to be used as a negative electrode plate will be designated as an electrode plate 22, respectively. The electrode plate 21 includes a first electrode plate 21A, a second electrode plate 21B and an electrode plate connecting portion 21C for electrically connecting the first electrode plate 21A and the second electrode plate 21B with each other.

Figure 4:
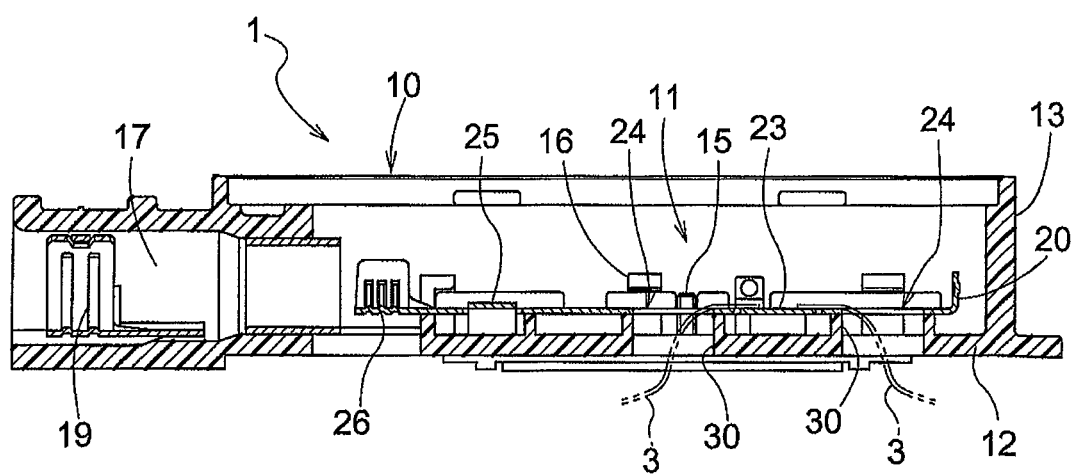
FIG. 4 is a section view taken along a line IV-IV in FIG. 3.

Each one of the first electrode plate 21A, the second electrode plate 21B and the electrode plate 22 includes a terminal connecting portion 23 and an aperture portion 24. FIG. 4 shows a section view taken along a line IV-IV in FIG. 3. As shown in FIG. 4, tabs 3 are connected to the terminal connecting portion 23. Here, FIG. 4 shows a state in which the tabs 3 are inserted into the accommodating space 11 through the both of the tab inserting holes 30. In an actual use, however, the tab 3 will be inserted through either one of the tab inserting holes 30. The connection between the terminal connecting portion 23 and the tab 3 can use solder for instance. Alternatively, the tab 3 may first be placed loosely on the terminal connecting portion 23 and then pressed against this terminal connecting portion 23 by a pressing portion (not shown) provided at a position in the top plate 14 opposing to the terminal connecting portion 23, thus realizing the connection.

Referring back to FIG. 3, between and across the first electrode plate 21A and the electrode plate 22, there is provided an electronic device attaching portion 25 allowing attachment of an electronic device. This electronic device attaching portion 25 can be formed by a bending work which per se is known. For instance, in case a voltage level relation between the pair of tabs 3 is reversed relative to a desired or expected such relation, a protection diode 70 (see FIG. 2) can be attached thereto in order to protect an external device to which the power generated by the solar cell module 2 is to be supplied.

Further, each one of the first electrode plate 21A and the electrode plate 22 includes a cable connecting portion 26. To this cable connecting portion 26, there is connected the above-described output cable 40 for transmitting the power generated by the solar cell module 2 to the external device. Here, the term "external device" corresponds to such component as another solar cell module constituting the same string 5, a connector box for combining outputs from the plurality of strings 5, etc. The cable connecting portion 26 has a U-shape in its axial cross section. Then, the output cable 40 will be inserted into its U-shaped groove and then the cable connecting portion 26 will be caulked, whereby the cable connecting portion 26 and the output cable 40 can be connected to each other.

The first electrode plate 21A, the second electrode plate 21B and the electrode plate 22 each has at least one bent portion in its outer edge, so that at least one portion in the outer edge may extend perpendicularly relative to the terminal connecting portion 23. The electrode plate 20 is disposed in the accommodating space 11. In the instant embodiment, the accommodating space 11 of the case 10 provides three disposing positions allowing disposing of the first electrode plate 21A, the second electrode plate 21B and the electrode plate 22. In the instant embodiment, the first electrode plate 21A, the second electrode plate 21B and the electrode plate 22 are clamped respectively by a plurality of positioning portions 15 extending erect from the bottom plate 12 and fixed by a plurality of pawl portions 16 extending also erect from the bottom plate 12.

Here, in the case 10, the tab inserting holes 30 allowing insertion of the tabs 3 into the accommodating space 11 are formed in an opposing face of this case 10 which face opposes to the electrode plate 20 and at positions thereof across the terminal connecting portions 23 of the pair of electrode plates 20 when the case 10 is viewed perpendicularly from above the opposing face. In the instant embodiment, the case 10 is provided in a square tubular form. Therefore, the faces included in the case 10 refer to the respective face of the square tube constituting the case 10. Also, in this embodiment, the opposing face opposing to the electrode plate 20 refers to the accommodating space 11 side face in the bottom face of the case 10. For this reason, the above language "when the case 10 is viewed perpendicularly from above the opposing face" means that the case 10 is viewed from above the top plate 14.

In this embodiment, the electrode plates 20 have elongate shape. In this case, the above-described positions across the terminal connecting portions 23 of the pair of electrode plates 20 means opposed outer sides of the terminal connecting portions 23 along the longitudinal direction of the electrode plates 20 when the case 10 is viewed from above the top plate 14. Thus, in the instant embodiment, the tab inserting holes 30 are provided in the bottom plate 12 of the case 10, at positions on the opposed outer sides of the terminal connecting portions 23 along the longitudinal direction of the electrode plates 20. Depending on the direction of each tab 3 to be inserted into the accommodating space 11, one of these two tab inserting holes 30 will be selected and the tab 3 will be inserted into/through the tab inserting hole 30 thus selected. With this, the tab 3 can be readily introduced into the accommodating space 11, irrespectively of the position or direction of this tab 3.

In the instant embodiment, in the electrode plate 20, the aperture portion 24 is formed at a position thereof opposing to the tab inserting hole 30. As described above, the bottom plate 12 of the case 10 defines a plurality of such tab inserting holes 30. Therefore, the electrode plate 20 includes the aperture portions 24 at positions opposing to these tab inserting holes 30 respectively. The aperture portion 24 is formed such that its aperture portion may be in agreement with the corresponding tab inserting hole 30 when the case 10 is viewed from the above. Therefore, when the tab 3 is inserted into and through the tab inserting hole 30 from the outside of the case 10, this tab 3 will be inserted also into and through the aperture portion 24 of the electrode plate 20 which aperture portion 24 is provided in opposition to the above tab inserting hole 30 into/through which the tab 3 has been inserted. With this arrangement, it is made possible to insert the tab 3 to the side closer to the top face of the case 10 than the electrode plate 20 in the accommodating space 11. Incidentally, as shown in FIG. 3, the electrode plate 20 (the electrode plate 22 in the example shown in FIG. 3) can include only one aperture portion 24.

Other Embodiments

In the foregoing embodiment, the electrode plate 21 is comprised of the first electrode plate 21A and the second electrode plate 21B connected to each other via the electrode plate connecting portion 21C therebetween. Instead, the electrode plate 21 can be comprised of only the first electrode plate 21A.

In the forgoing embodiment, the case 10 was explained as the tab inserting holes 30 for introducing the tabs 3 into the accommodating space 11 are formed in the opposing face of the faces included in the case 10 opposing to the electrode plate 21, at positions across the terminal connecting portions 23 of the pair of electrode plates 21 as the case 10 is viewed perpendicularly from above the opposing face. Instead, the tab inserting holes 30 for introducing the tabs 3 into the accommodating space 11 can be formed only at positions across one terminal connecting portion 23 of the terminal connecting portions 23 of the pair of electrode plates 21.

In the foregoing embodiment, it was explained that in the case 10, the accommodating space 11 provides three disposing positions allowing disposing of the first electrode plate 21A, the second electrode plate 21B and the electrode plate 22. Instead, the accommodating space 11 can provide four or more such disposing positions. In such case, the electrode plate 21 can be comprised of three electrode plates and electrode plate connecting portions for interconnecting these plates. Or, the electrode plate 21 can be comprised of two electrode plates and an electrode plate connecting portion for interconnecting these plates whereas the electrode plate 22 can be comprised of two electrode plates and an electrode plate connecting portion interconnecting these electrode plates. Further alternatively, the electrode plate 21 can be comprised of a single electrode plate whereas the second electrode plate 22 can be comprised of three electrode plates and electrode plate connecting portions interconnecting these electrode plates.

In the foregoing embodiment, the arrangement of the first electrode plate 21A, the second electrode plate 21B and the electrode plate 22 being respectively provided in the elongate shape was shown in FIG. 3. Instead, these may be provided in any other shapes.

In the foregoing embodiment, it was explained that the tab inserting holes 30 are formed at the positions across at least one terminal connecting portion 23 of the pair of electrode plates 21 as the case 10 is viewed perpendicularly from above. Instead, a plurality of tab inserting holes 30 can be formed at positions in different directions relative to at least one terminal connecting portion 23 of the pair of electrode plates 21 as the center, as the case 10 is viewed perpendicularly from above. In this alternative case too, by selecting a tab inserting hole 30 depending on the direction along which a particular tab 3 is to be inserted into the terminal box 1, this tab 3 can be readily inserted into the accommodating space 11.

APPLICABILITY OF DISCLOSURE

This disclosure is applicable to a terminal box with a pair of tabs connected thereto for outputting electric power generated by a solar cell module.

The invention claimed is:

1. A terminal box with a pair of tabs connected thereto for outputting electric power generated by a solar cell module, the terminal box comprising:
   a case having an accommodating space therein; and
   a pair of electrode plates disposed in the accommodating space;
   each one of the pair of electrode plates having: a terminal connecting portion to be connected with the tab; and a cable connecting portion to which an output cable transmitting the electric power to an external device is connected; and
   the case having a pair of tab inserting holes allowing insertion of the tabs to be connected to the terminal connecting portion into the accommodating space, the tab inserting holes being formed in an opposing face of the case opposing the electrode plates and at positions across the terminal connecting portion of at least one electrode plate of the pair of electrode plates as the case is viewed perpendicularly above the opposing face.

2. The terminal box according to claim 1, wherein each one of the electrode plates defines an aperture portion at a position opposing to the tab inserting hole.

3. The terminal box according to claim 2, wherein the case has at least three disposing positions allowing disposing of the electrode plates in the accommodating space.

4. The terminal box according to claim 1, wherein the case has at least three disposing positions allowing disposing of the electrode plates in the accommodating space.

* * * * *